(12) United States Patent
Wakamatsu et al.

(10) Patent No.: US 7,760,381 B2
(45) Date of Patent: Jul. 20, 2010

(54) PRINTER AND METHOD OF CONTROLLING THE SAME

(75) Inventors: Jun Wakamatsu, Saitama (JP); Yuriko Inakawa, Saitama (JP); Noriyuki Tatsuma, Saitama (JP); Eijii Nishi, Saitama (JP); Atsuhiro Itoh, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1177 days.

(21) Appl. No.: 11/061,884

(22) Filed: Feb. 22, 2005

(65) Prior Publication Data
US 2006/0066892 A1 Mar. 30, 2006

(30) Foreign Application Priority Data
Sep. 24, 2004 (JP) .............................. 2004-278378

(51) Int. Cl.
*G06F 3/12* (2006.01)
*G06K 15/00* (2006.01)
(52) U.S. Cl. ...................... 358/1.15; 358/1.16; 358/1.17
(58) Field of Classification Search ........ 358/1.14–1.17, 358/402, 442, 1.9, 400, 401, 404, 406, 407, 358/448, 504; 400/77, 78; 709/204–207, 709/223, 224
See application file for complete search history.

(56) References Cited

U.S. PATENT DOCUMENTS

| | | | | |
|---|---|---|---|---|
| 6,141,111 | A * | 10/2000 | Kato | 358/1.15 |
| 6,727,998 | B1 * | 4/2004 | Tomiyasu | 358/1.15 |
| 6,932,523 | B1 * | 8/2005 | Yamada et al. | 400/78 |
| 7,167,264 | B2 * | 1/2007 | Takamiya | 358/1.15 |
| 2001/0028473 | A1 * | 10/2001 | Yamasaki et al. | 358/1.15 |
| 2002/0131069 | A1 * | 9/2002 | Wanda | 358/1.14 |
| 2003/0103236 | A1 * | 6/2003 | Kato | 358/1.15 |
| 2003/0197890 | A1 * | 10/2003 | Satake et al. | 358/1.15 |
| 2005/0007624 | A1 * | 1/2005 | Henry | 358/1.15 |
| 2005/0068566 | A1 * | 3/2005 | Nishiguchi | 358/1.15 |

FOREIGN PATENT DOCUMENTS

| | | |
|---|---|---|
| JP | A-11-203068 | 7/1999 |
| JP | A-2003-044255 | 2/2003 |
| JP | 2004-102916 | 4/2004 |

OTHER PUBLICATIONS

Apr. 13, 2010 Office Action issued in Japanese patent application No. 2004-278378.

* cited by examiner

*Primary Examiner*—James A Thompson
(74) *Attorney, Agent, or Firm*—Oliff & Berridge, PLC

(57) ABSTRACT

A printer for receiving print data transmitted from a client device via a network and for effecting print processing on the basis of the received print data, comprising: a detecting unit which detects whether or not the print processing has been completed properly; a determining unit which determines a cause if it has been detected by the detecting unit that the print processing has not been completed properly; a storing unit which stores the print data in a file server on the network if it has been detected by the detecting unit that the print processing has not been completed properly; and a mail transmitting unit which transmits to the client device by an electronic mail a cause of the improper completion of the print processing determined by the determining unit and storage position information on the print data stored by the storing unit.

16 Claims, 9 Drawing Sheets

PRINTER AND METHOD OF CONTROLLING THE SAME

BACKGROUND OF THE INVENTION

1. Field of the Invention

The present invention relates to a printer for receiving print data transmitted from a client PC via a network and for effecting print processing on the basis of the received print data, as well as a method of controlling the same.

2. Description of the Related Art

In printing making use of a network, since the client side and the printer are located away from each other, it is not easily possible to directly ascertain the state of the printer. When a print request has been issued from the client side to the printer, in a case where printing could not be effected properly due to a failure occurring in the printer, running out of paper, running out of toner, or the like, a user is unable to notice that printing could not be done. In addition, if the printer does not have a spool (HDD, a memory, etc.), the sent print data is inevitably deleted.

At the time of executing printing again, it has been necessary to prepare the print data again on the client side, and make a print request again to the printer.

Japanese Patent Application Laid-open No. 2004-102916 discloses a technique in which electronic mail to which data subject to printing is attached and in which printing attributes, an address of a transfer destination, and the like are described in the text of the mail is sent from a personal computer to a printer, and in the event that an obstacle hampering printing has occurred in the printer, the received mail is transferred to the address of the transfer destination described in the text of the received mail, and a notification is given thereto to the effect that it has been transferred.

However, particularly in the printer which does not have a spool, in the event that an obstacle hampering printing has occurred, the print data is inevitably deleted in the printer. At the time of executing printing again, it has been necessary to prepare the print data again on the client side, and subsequently issue a print request again.

In addition, even if the printer has a spool, in a case where the print data transmitted from the client side is large, the print data cannot be stored in the spool. Furthermore, if preceding print data is already stored in the spool, there are cases where following print data cannot be stored, in which case the print data is deleted.

In addition, according to the technique of Japanese Patent Application Laid-open No. 2004-102916, it is possible to know that printing could not be effected properly, but since only a notification is given to the effect that the print data has been transferred, in order for the client to obtain a printing result again, it is necessary to send from the client side electronic mail with the print data attached thereto. This operation is troublesome, and the client side is inevitably restrained until printing is completed.

Accordingly, an object of the present invention is to provide a printer which, in the event of printing failure by the printer, makes it possible for the client device to obtain the print data without forming the print data again, as well as a method of controlling the same.

SUMMARY OF THE INVENTION

An aspect of the present invention provides a printer for receiving print data transmitted from a client device via a network and for effecting print processing on the basis of the received print data, comprising: a detecting unit which detects whether or not the print processing has been completed properly; a determining unit which determines a cause if it has been detected by the detecting unit that the print processing has not been completed properly; a storing unit which stores the print data in a file server on the network if it has been detected by the detecting unit that the print processing has not been completed properly; and a mail transmitting unit which transmits to the client device by an electronic mail a cause of the improper completion of the print processing determined by the determining unit and storage position information on the print data stored by the storing unit.

A further aspect of the present invention provides a printer for receiving print data transmitted from a client device via a network and for effecting print processing on the basis of the received print data, comprising: a detecting unit which detects whether or not the print processing has been completed properly; a determining unit which determines a cause if it has been detected by the detecting unit that the print processing has not been completed properly; and a mail transmitting unit which transmits to the client device by an electronic mail via a mail server on the network the print data and the cause of the improper completion of the print processing determined by the determining unit, if it has been detected by the detecting unit that the print processing has not been completed properly.

A still further aspect of the present invention provides a printer for receiving print data transmitted from a client device via a network and for effecting print processing on the basis of the received print data, comprising: a detecting unit which detects whether or not the print processing has been completed properly; a determining unit which determines a cause if it has been detected by the detecting unit that the print processing has not been completed properly; and a mail transmitting unit which transmits to an own device by an electronic mail via a mail server on the network the print data and the cause of the improper completion of the print processing determined by the determining unit, if it has been detected by the detecting unit that the print processing has not been completed properly.

A still further aspect of the present invention provides a method of controlling a printer for receiving print data transmitted from a client device via a network and for effecting print processing on the basis of the received print data, comprising: detecting by a detecting unit whether or not the print processing has been completed properly; determining a cause by a determining unit if it has been detected by the detecting unit that the print processing has not been completed properly; storing the print data in a file server on the network by a storing unit if it has been detected by the detecting unit that the print processing has not been completed properly; and transmitting by a mail transmitting unit to the client device by an electronic mail the cause of the improper completion of the print processing determined by the determining unit and storage position information on the print data stored by the storing unit.

A still further aspect of the present invention provides a method of controlling a printer for receiving print data transmitted from a client device via a network and for effecting print processing on the basis of the received print data, comprising: detecting by a detecting unit whether or not the print processing has been completed properly; determining a cause by a determining unit if it has been detected by the detecting unit that the print processing has not been completed properly; and transmitting by a mail transmitting unit to the client device by an electronic mail via a mail server on the network the print data and the cause of the improper completion of the print processing determined by the determining unit, if it has been detected by the detecting unit that the print processing has not been completed properly.

A still further aspect of the present invention provides a method of controlling a printer for receiving print data transmitted from a client device via a network and for effecting print processing on the basis of the received print data, comprising: detecting by a detecting unit whether or not the print processing has been completed properly; determining a cause by a determining unit if it has been detected by the detecting unit that the print processing has not been completed properly; and transmitting by a mail transmitting unit to an own device by an electronic mail via a mail server on the network the print data and the cause of the improper completion of the print processing determined by the determining unit, if it has been detected by the detecting unit that the print processing has not been completed properly.

According to the printer and the method of controlling the same in accordance with the present invention, there are provided a detecting unit which detects whether or not the print processing has been completed properly; a determining unit which determines a cause if it has been detected by the detecting unit that the print processing has not been completed properly; a storing unit which stores the print data in a file server on the network if it has been detected by the detecting unit that the print processing has not been completed properly; and a mail transmitting unit which transmits to the client PC by electronic mail the cause of the improper completion of the print processing determined by the determining unit and storage position information on the print data stored by the storing unit. Accordingly, an advantage is offered in that in the event that printing has failed in the printer, it is possible for the client device to obtain the print data without forming the print data again.

BRIEF DESCRIPTION OF THE DRAWINGS

Embodiments of the present invention will be described in detail based on the following figures, wherein.

DETAILED DESCRIPTION OF THE INVENTION

Referring now to the accompanying drawings, a detailed description will be given of the embodiments of a printer and a printing method to which the invention is applied.

First Embodiment

Figure 1:
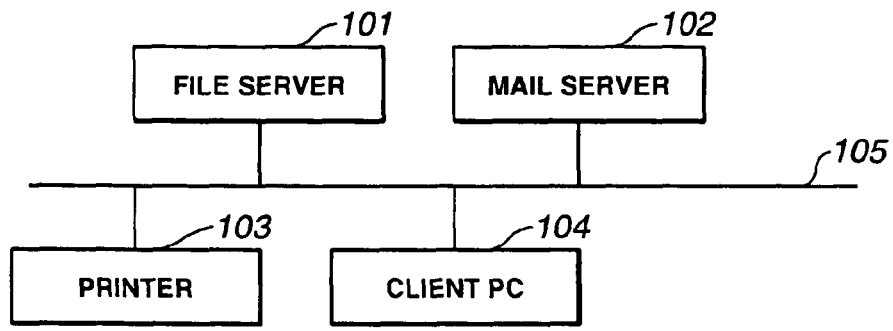
FIG. 1 is a block diagram representing a network environment configured by including a printer 103 in a first embodiment

First, a description will be given of a network environment configured by a printer to which the present invention is applied. FIG. 1 is a block diagram representing a network environment configured by including a printer to which the invention is applied in a first embodiment.

The following are connected to a network 105: a printer 103 to which the present invention is applied; a file server 101 for storing print data; a mail server 102 for managing various types of mail; and a client PC 104 for issuing a print request.

The network environment shown in FIG. 1 is sufficient if it is such an environment that a print request can be made from the client PC 104 to the printer 103, the client PC 104 and the printer 103 are capable of accessing the file server 101, and the printer 103 and the client PC 104 are capable of transmitting and receiving mail. The configuration of the network may not be of the type shown in FIG. 1.

Next, the internal structure of the printer 103 to which the present invention is applied will be described with reference to a block diagram shown in FIG. 2.

Figure 2:
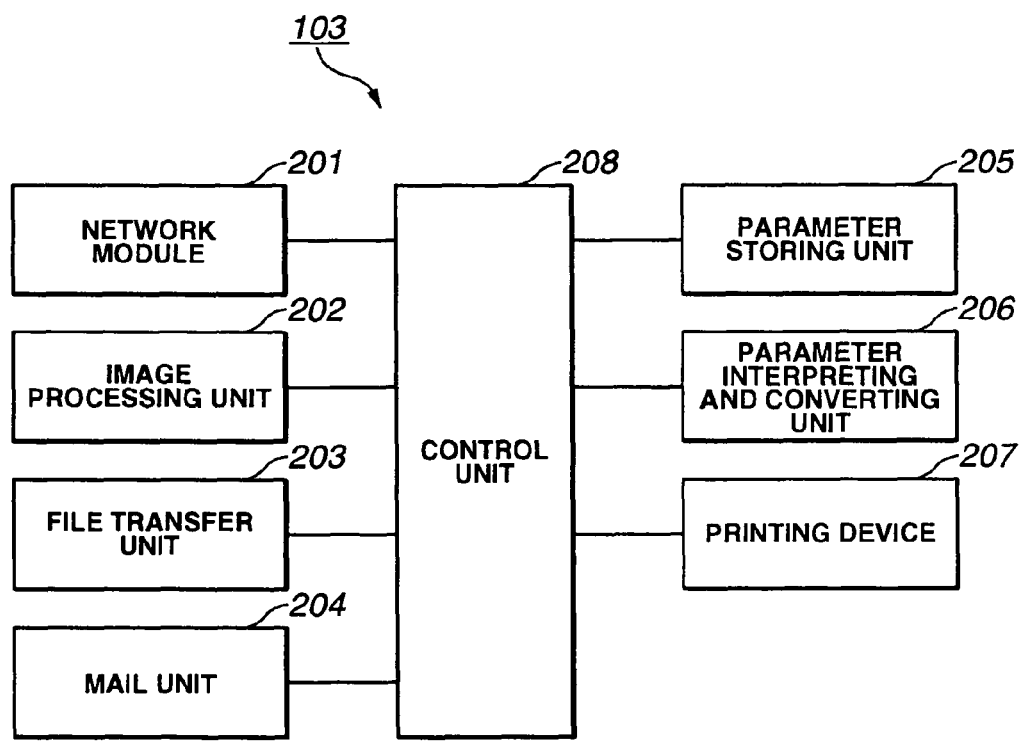
FIG. 2 is a block diagram illustrating the internal structure of the printer 103

FIG. 2 is a block diagram illustrating the internal structure of the printer 103.

The printer 103 is configured by a network module 201 for exchanging information with devices on the network 105; an image processing unit 202 for effecting image processing; a file transfer unit 203 for transferring data to a file server; a mail unit 204 for administering the function of transmission and reception or the like of electronic mail; a parameter storing unit 205 for storing parameters used in the printer 103; a parameter interpreting and converting unit 206 for interpreting and converting the parameters; a printing device 207 for executing printing; and a control unit 208 connected to the respective component units to control the various component units and for detecting whether or not printing has been completed properly and determining a cause.

Next, referring to FIG. 3, a description will be given of the flow of print data and mail in the network environment shown in FIG. 1.

Figure 3:
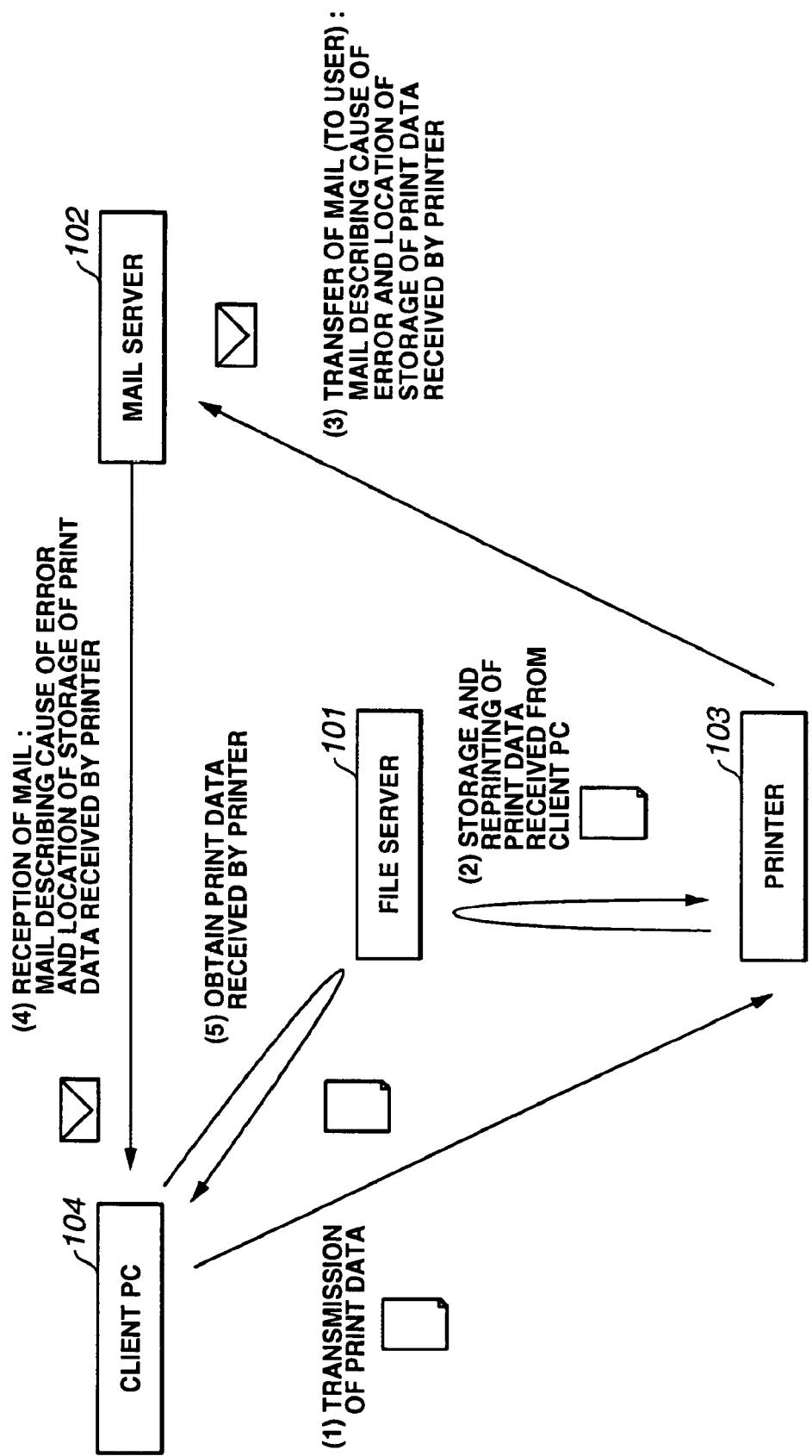
FIG. 3 is a block diagram illustrating the flow of print data and mail in the network environment including the printer 103 in the first embodiment.

FIG. 3 is a block diagram illustrating the flow of print data and mail in the network environment including the printer 103 to which the present invention is applied.

First, the client PC 104 which makes a print request transmits print data to the printer 103 by using a printing protocol (LPD (Line Printer Daemon) or the like).

In the interior of the printer 103 to which the print data has been sent, the print data is accepted by the network module 201.

The accepted print data is sent to the image processing unit 202 and is developed into raster data.

Then, printing is started by the printing device 207 by using the print data developed into the raster data.

However, in a case where printing has not been effected properly due to a failure occurring in the printer 103, running out of paper, running out of toner, or the like, the print data accepted by the network module 201 is sent to the file server 101.

After the lapse of a fixed period of time upon the storage in the file server 101, or after the cause of printing failure has been remedied, the printer 103 receives from the file server 101 the data stored in the file server 101 by the printer 103, and attempts at printing again.

In the printer 103, printing is repeatedly effected to obtain proper printing results. However, in a case where printing was impossible in the final end, electronic mail describing the cause of printing failure, the address of the file server in which the print data accepted by the network module 201 is stored, and the location of storage in that file server is sent from the mail unit 204 in the printer 103 to the client PC 104 which requested printing to the printer 103.

The electronic mail sent by the printer 103 is sent to the client PC 104 via the mail server 102.

In the client PC 104 to which the electronic mail has been sent, the address of the file server and the location of storage in the file server described in the electronic mail are read, and the print data is obtained from the file server.

Next, referring to FIGS. 4 and 5 which are flowcharts, a description will be given of the processing which is effected inside the printer 103.

Figure 4:
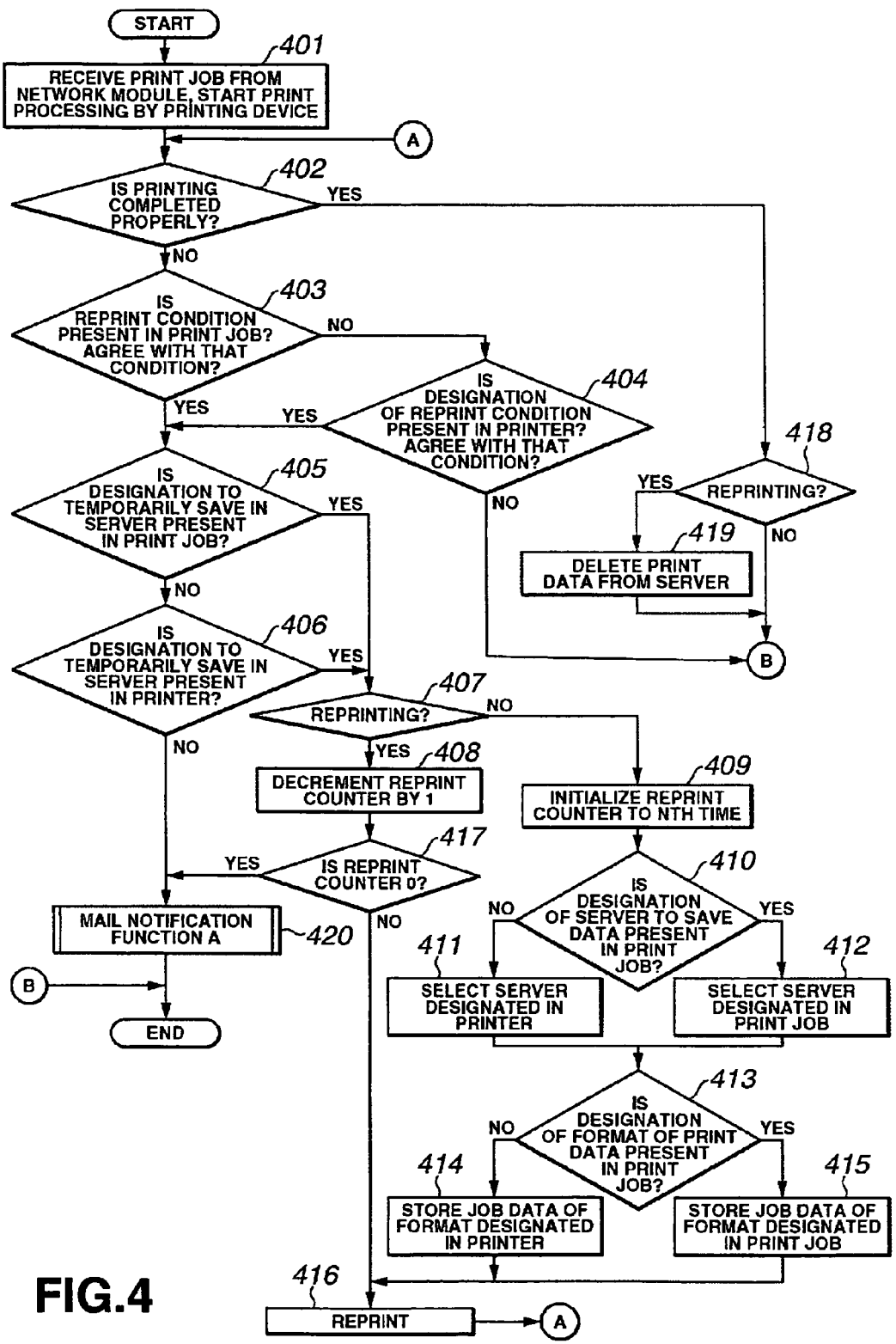
FIG. 4 is a flowchart illustrating the flow of processing which is effected by the printer 103 in the first embodiment.

FIG. 4 is a flowchart illustrating the flow of processing which is effected by the printer 103. When the printer 103 receives the print job from the client PC 104 through the network module 201, the print data is rasterized in the image processing unit 202, and printing is effected by the printing device 207 (Step 401).

If printing was completed properly (YES in Step 402), a confirmation is made as to whether or not the printing is reprinting. Then, if the printing was reprinting (Yes in Step 418), print data is deleted from the server, and the processing ends. Or, if the printing was not reprinting (NO in Step 418), the processing ends. If printing was not completed properly (NO in Step 402), a confirmation is made as to whether or not there is a reprinting condition in the print job sent from the client PC 104 and whether or not the situation disabling printing agrees with the reprinting condition included in the print job. If they do not agree (NO in Step 403), a confirmation is made as to whether or not there is a designation of a reprinting condition in the printer 103 and whether or not the situation disabling printing agrees with the designation of the reprinting condition set in the printer 103 (Step 404).

If the situation disabling printing does not agree with the designation of the reprinting condition set in the printer 103, it is determined that the situation does not agree with the designation of the reprinting condition, and the processing ends.

If the situation disabling printing agrees with the reprinting condition included in the print job or the designation of the reprinting condition included in the printer 103 (YES in Step 403 or Step 404), a confirmation is then made as to whether or not the print job or the printer 103 has a designation of temporary save in the server (Step 405 or Step 406).

If the print job or the printer 103 does not have a designation of temporary save in the server (NO in Step 405 and Step 406), the print data is not stored in the server, and a mail notification function A (Step 420) of sending mail on the cause of printing failure is executed.

If the print job or the printer 103 has a designation of temporary save in the server (YES in Step 405 or Step 406), a determination is then made as to whether or not the printing determined in Step 402 is the printing effected upon receiving the print data from the file server (Step 407). If it was not reprinting (NO in Step 407), a reprint counter is initialized to an Nth time in the parameter storing unit 205 (Step 409).

The value of N is set in the printer 103 as a fixed or variable default value, or is set for each print job which is requested to the printer 103 from the client PC 104.

Then, if the print job received from the client PC 104 has a designation of the server storing the print data (YES in Step 410), the server designated in the print job is selected as the server storing the print data (Step 412). If the print job does not have a designation (NO in Step 410), a server designated with a default value which is peculiar to the printer 103 or variable is selected as the server storing the print data (Step 411).

Concerning the designation of the server, the location of storage in the server is also designated.

In addition, the server which is designated may be not only the file server but is sufficient if it is a server capable of storing the print data, and may be a Web server or the like.

If the server storing the print data is selected in Step 411 or 412, a confirmation is then made as to whether or not the format of the print data which is stored has been designated in the print job received from the client PC 104 (Step 413).

If the format of the print data has been designated in the print job (YES in Step 413), the print data of the designated format is stored in the server selected in Step 411 or Step 412 from the file transfer unit 203 (Step 415).

If the format of the print data has not been designated in the print job (NO in Step 413), the print data of a format designated with a default value which is peculiar to the printer 103 or variable is stored in the server selected in Step 411 or Step 412 from the file transfer unit 203 (Step 414).

When the print data is stored in the designated server with a designated format, after the lapse of a fixed period of time or after a failure occurring in the printer, running out of paper, running out of toner, or the like, which is the cause of printing failure, has been remedied, the printer 103 receives the print data from the server where the print data is stored, and reprinting is effected (Step 416).

As stated above, printing is effected again and print processing is completed properly (YES in Step 402), the print data is deleted by the file server 101 in FIG. 3 in which the print data is stored (Step 419), and the processing ends. However, in a case where the print processing is not completed properly, a determination is made in Step 407 through Step 403 or Step 404 and through Step 405 or Step 406 that it is a reprint job. Subsequently, a reprint counter stored in the parameter storing unit 205 is decremented by one in the parameter interpreting and converting unit 206, and the decremented reprint counter is stored in the parameter storing unit 205 (Step 408).

Next, a determination is made in the parameter interpreting and converting unit 206 as to whether or not the reprint counter stored in the parameter storing unit 205 is 0 (Step 417).

If the reprint counter is not 0, after the lapse of a fixed period of time or after the cause of printing failure has been remedied, the printer 103 receives again the print data from the file server 101 where the print data is stored, and reprinting is effected (Step 416).

In Step 417, if it is confirmed that the reprint counter has been set to 0 in the parameter interpreting and converting unit 206, reprinting is not effected anymore. Next, the mail notification function A is executed to send mail describing the cause of printing failure, the address of the file server, and the location of storage in that server (Step 420).

Next, referring to FIG. 5, a description will be given of the mail notification function A.

Figure 5:
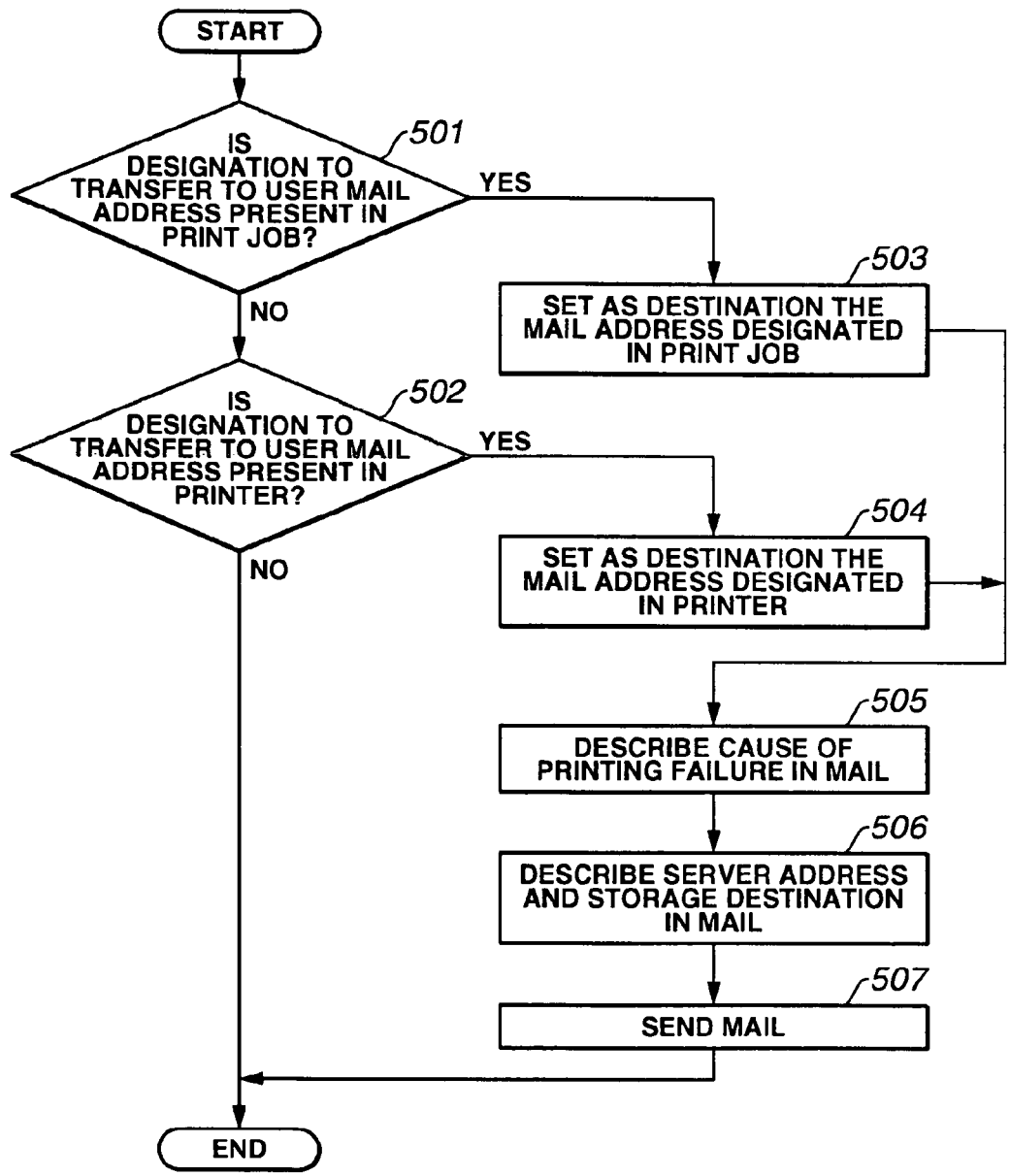
FIG. 5 is a flowchart illustrating the processing flow of a mail notification function A which is processing in a subroutine in Step 420 in FIG. 4.

FIG. 5 is a flowchart illustrating the processing flow of the mail notification function A in Step 420 of the flowchart in FIG. 4.

First, in the notification function A, a determination is made as to whether or not there is a designation of a destination of mail in the print job received from the client PC 104 (Step 501). If there is no designation of the destination of the mail (NO in Step 501), a determination is made as to whether or not there is a designation of the destination of the mail in the printer 103 (Step 502).

If there is a designation of the destination of the mail in the print job or the printer 103 (Step 501 or 502), the designated mail address is set as the destination of delivery (Step 503 or 504).

Then, the cause of printing failure is described in the mail (Step 505), and the address of the server in which the print data is stored and the location of storage of the print data in that server are described in the mail (Step 506).

Upon completion of the mail to be delivered, that mail is transmitted to the mail address selected in Step 503 or Step 504, and the processing ends (Step 507).

It should be noted that if, in Step 405 and Step 406, the print job and the printer 103 do not have a designation of temporary save in the server (NO in Steps 405 and 406), the mail notification function A is executed in Step 420 to send mail describing the cause of printing failure.

It should be noted that, in the processing of the mail notification function A which is executed in the case of NO in Steps 405 and 406, the location of storage in the file server 101 where the print data is stored is not described in Step 506.

It should be noted that in a case where printing was impossible in the final end as a result of reprinting, instead of sending the mail describing the cause of printing failure and the location of storage in the file server 101 where the print data is stored, mail describing the cause of printing failure and having the print data attached thereto may be sent to a designated user, and the print data which was left in the file server 101 without being deleted may be deleted.

In the mail notification function A, instead of sending the mail describing the cause of printing failure, the address of the server in which the print data is stored, and the location in that server, mail may be sent which describes the cause of printing failure and having attached thereto the print data stored in the server and used in reprinting, and the print data may be deleted from the server.

It should be noted that the selection of either sending the mail describing the cause of printing failure and the location of storage in the file server 101 where the print data is stored or sending the mail describing the cause of printing failure and having the print data attached thereto is determined on the basis of a fixed or variable default value set in the printer 103, or is determined for each print job requested from the client PC 104.

It should be noted that in the case where printing is not completed properly, even in the case where the situation does not agree with the designation of the reprinting condition and reprinting is not effected in Step 403 or Step 404, the print data may be stored in the server, the cause of printing failure and the location of storage of the print data in the server may be described in the electronic mail, and the mail may be sent to a designated destination in the print job or the printer 103.

It should be noted that in the case where printing is not completed properly, even in the case where the situation does not agree with the designation of the reprinting condition and reprinting is not effected in Step 403 or Step 404, the print data may be stored in the server, electronic mail describing the cause of printing failure and having the print data attached thereto may be sent to a designated destination in the print job or the printer 103.

It should be noted that in this embodiment, when the print data is stored in the server or attached to the electronic mail, not all the print data may be subject to the storage or attachment, and the data on the pages for which printing has been effected properly may be discarded and only the data on unprinted pages may be subject to the storage or attachment.

It should be noted that in this embodiment the contents which are set in advance may be provided in the printer 103 as fixed or variable default values, or may be selected for each print job.

It should be noted that even in the case where the printer 103 has a designation of a reprinting condition, and the situation disabling printing agrees with that condition (in the case of YES in Step 404), a setting may be provided in the print job such that processing results in NO in Step 404, thereby making it possible to terminate the processing in the case where printing was not completed properly.

It should be noted that in the case where printing was not effected properly, even in the case where the printer 103 has a designation for temporarily saving the print data in the server (in the case of YES in Step 406), a setting may be provided in the print job such that it is also made possible not to temporarily save the print data in the server (the subsequent processing flow proceeds to the processing at the time when NO is selected in Step 406).

It should be noted that in this embodiment in the case where printing was not effected properly in the final end after reprinting, it may also be made possible to terminate the processing without sending mail to a designated address.

It should be noted that in this embodiment in the case where printing was not effected properly in the final end after reprinting, the print data may be deleted from the file server 101, and it may be made possible to send mail describing only the cause of printing failure.

It should be noted that in this embodiment the format of the print data attached to the electronic mail may be provided as a fixed or variable default value set in the printer 103, or may be selected for each print job issued by the client PC 104.

Second Embodiment

In a second embodiment, referring to the accompanying drawings, a description will be given of a printer and a printing method to which the present invention is applied without using a file server.

First, a description will be given of a network environment configured by a printer to which the present invention is applied without using a file server.

Figure 6:
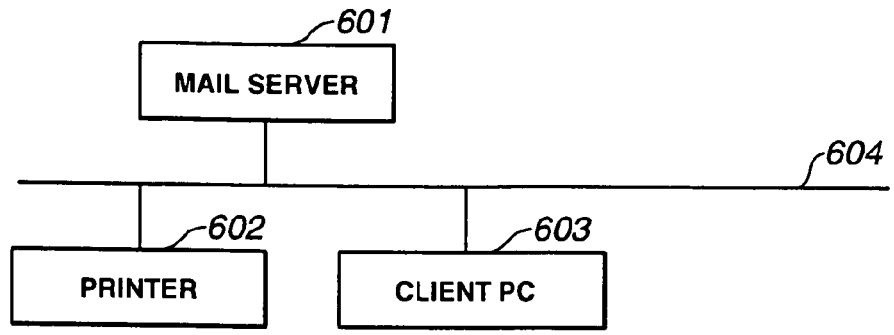
FIG. 6 is a block diagram representing a network environment configured by including a printer 602 in a second embodiment.

FIG. 6 is a block diagram representing a network environment configured by including a printer to which the invention is applied in this embodiment.

The following are connected to a network 604: a printer 602 to which the present invention is applied; a mail server 601 for managing mail; and a client PC 603 for issuing a print request.

The network environment shown in FIG. 6 is sufficient if it is such an environment that a print request can be made from the client PC 603 to the printer 602, and the client PC 603 and the printer 602 are capable of transmitting and receiving mail. The configuration of the network may not be of the type shown in FIG. 6.

Next, the internal structure of the printer 602 to which the present invention is applied will be described with reference to a block diagram shown in FIG. 7.

Figure 7:
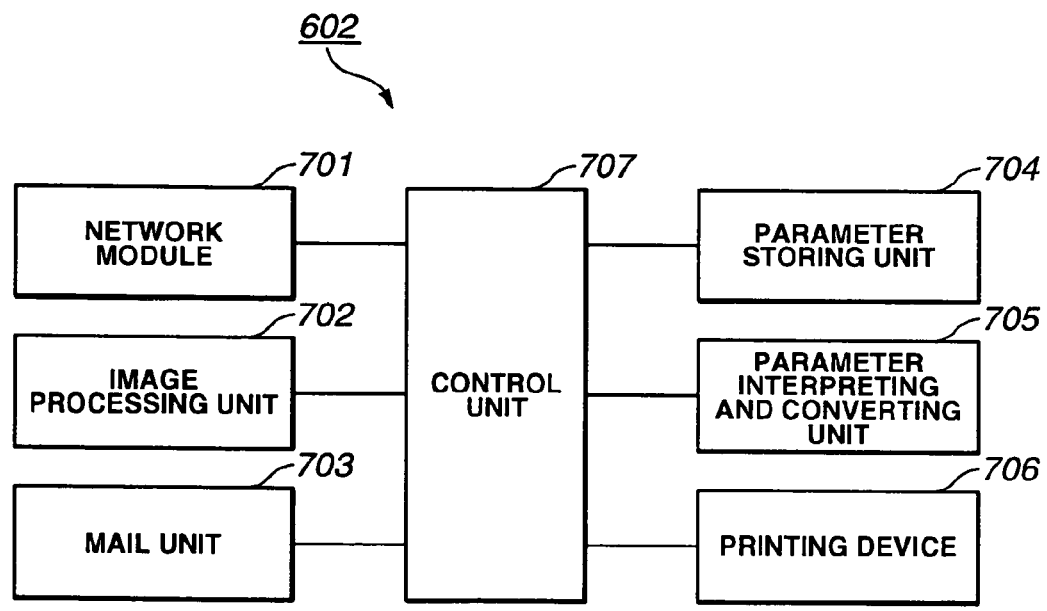
FIG. 7 is a block diagram illustrating the internal structure of the printer 602.

FIG. 7 is a block diagram illustrating the internal structure of the printer 602.

The printer 602 is configured by a network module 701 for exchanging information with devices on the network 604; an image processing unit 702 for effecting image processing; a mail unit 703 for administering the function of transmission and reception or the like of electronic mail; a parameter storing unit 704 for storing parameters used in the printer 602; a parameter interpreting and converting unit 705 for interpreting and converting the parameters; a printing device 706 for executing printing; and a control unit 707 connected to the respective component units to control the various component units.

Next, referring to FIG. 8, a description will be given of the flow of print data and mail in the network environment shown in FIG. 6.

Figure 8:
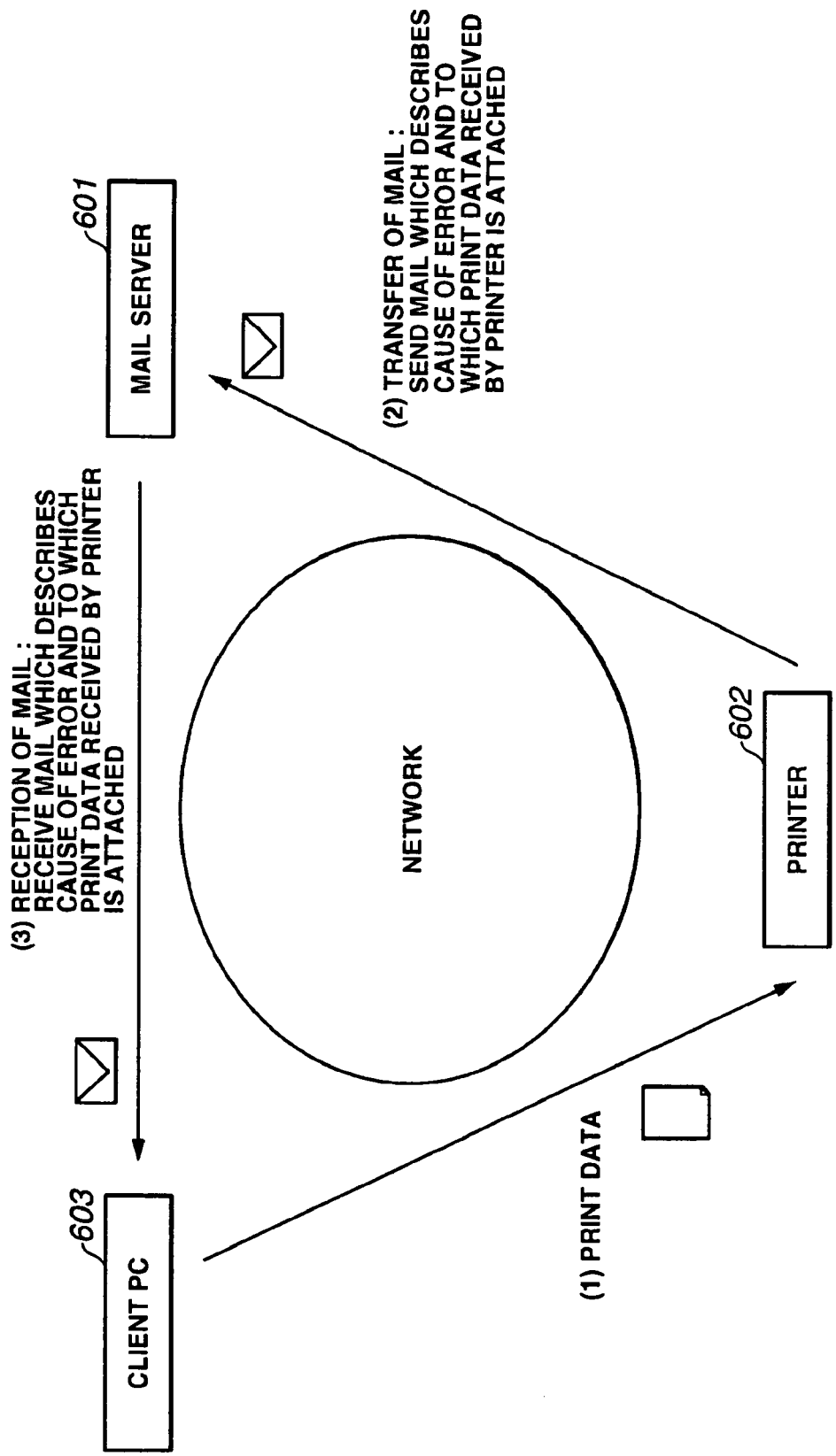
FIG. 8 is a block diagram illustrating the flow of print data and mail in the network environment including the printer 602 in the second embodiment.

FIG. 8 is a block diagram illustrating the flow of print data and mail in the network environment including the printer 602 to which the present invention is applied.

First, the client PC 603 which makes a print request transmits print data to the printer 602 by using a printing protocol (LPD (Line Printer Daemon) or the like).

In the interior of the printer 602 to which the print data has been sent, the print data is accepted by the network module 701.

The accepted print data is sent to the image processing unit 702 and is developed into raster data.

Then, printing is started by the printing device 706 by using the print data developed into the raster data by the image processing unit 702.

However, in a case where printing has not been effected properly due to a failure occurring in the printer 602, running out of paper, running out of toner, or the like, the cause of printing failure and the print data accepted by the network module 701 are sent from the mail unit 703 to the client PC 603 or the like by making use electronic mail.

The electronic mail sent from the mail unit 703 in the printer 602 reaches the client PC 603 via the mail server 601.

On the client PC 603 side to which the electronic mail has been sent, it is possible to confirm the cause of printing failure by viewing the contents of the electronic mail, and it is possible to obtain the print data attached to the electronic mail.

Next, referring to FIG. 9 which is a flowchart, a description will be given of the processing which is effected inside the printer 602.

Figure 9:
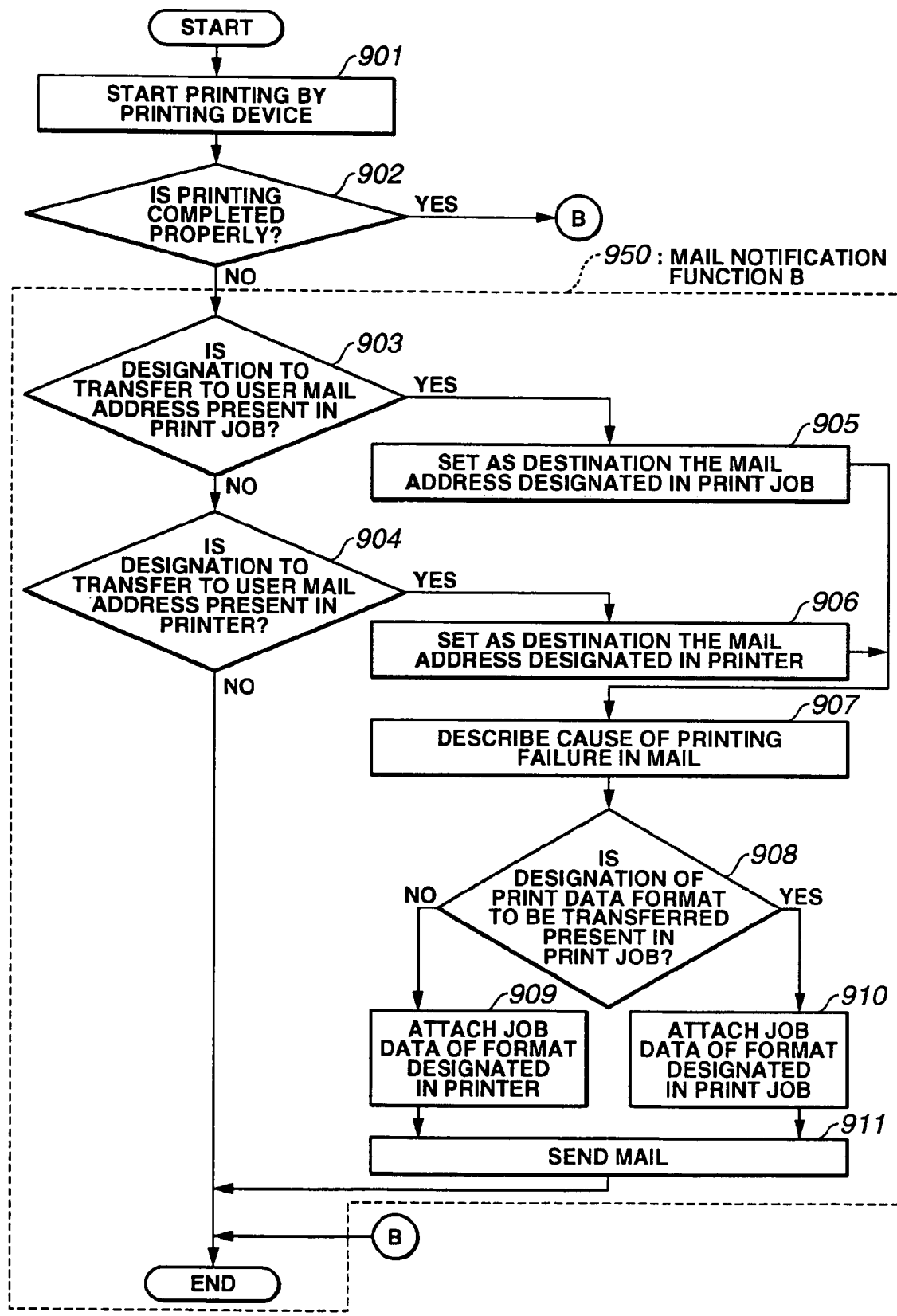
FIG. 9 is a flowchart illustrating the flow of processing which is effected by the printer 602 in the second embodiment.

FIG. 9 is a flowchart illustrating the flow of processing which is effected by the printer 602.

When the printer 602 receives the print job from the client PC 603, the print data is rasterized in the image processing unit 702, and printing is effected by the printing device 706 (Step 901).

If printing was not completed properly (NO in Step 902), a confirmation is made as to whether or not there is a designation for sending electronic mail in the print job received from the client PC 603 or in the printer 602 (Step 903 or Step 904). If there is a designation of the destination (YES in Step 903 or YES in Step 904), the designated destination is selected as the destination of the electronic mail (Step 905 or Step 906).

In the case where a mail address other than that of the client PC 603 has thus been designated in the print job or the printer 602, mail is sent to a location other than the client PC 603.

Then, the cause of printing failure is described in the mail (Step 907).

After the contents of the mail sent by the printer 602 are described, a determination is made as to whether or not there is a designation concerning the format of the print data to be transferred by electronic mail in the print job received from the client PC 603. If there is a designation (YES in Step 908), the print data is attached to the electronic mail in the designated format (Step 910).

If there is no designation (NO in Step 908), the print data is attached to the electronic mail in the data format designated in the printer 602 (Step 909).

Then, when the electronic mail is prepared, the electronic mail is sent to the destination selected in Step 905 or 906, and the processing ends.

On the other hand, if the destination of the electronic mail to be sent has not been designated in Step 903 and Step 904, the electronic mail is not sent, and the processing ends.

It should be noted that the processing steps ranging from Step 903 to Step 911 will be referred to as a mail notification function B-950, which will be used in the description of a third embodiment.

It should be noted that as for the print data sent by being attached to the electronic mail, all the print data may be attached, or printed data may be discarded and only unprinted data may be attached and sent.

It should be noted that in this embodiment, instead of sending both the cause of printing failure and the print data by electronic mail, only the cause of printing failure may be sent by electronic mail, or only the print data may be sent in an attachment file.

It should be noted that even in a case where a setting of the destination for sending electronic mail has been provided in the printer 602 (in the case of YES in Step 904), if a setting is provided in the print job, it is possible not to send the electronic mail in the case where printing has not been effected properly.

It should be noted that in this embodiment the contents which are set in advance may be provided in the printer 602 as fixed or variable default values, or may be selected for each print job.

Third Embodiment

In a third embodiment, referring to the accompanying drawings, a description will be given of a printer and a printing method to which the present invention is applied without using a file server, and in which reprinting is effected by the printer in a case where printing was impossible.

First, since the network environment configured by including the printer to which the present invention is applied in this embodiment is identical to the configuration described in the second embodiment and shown in FIG. 6, a description thereof will be omitted to avoid redundancy.

In addition, since the internal structure of the printer 602 to which the present invention is applied is also identical to the internal structure described in the second embodiment and shown in FIG. 7, a description thereof will be omitted to avoid redundancy.

Next, referring to FIG. 10, a description will be given of the flow of print data and mail in the network environment shown in FIG. 6.

Figure 10:
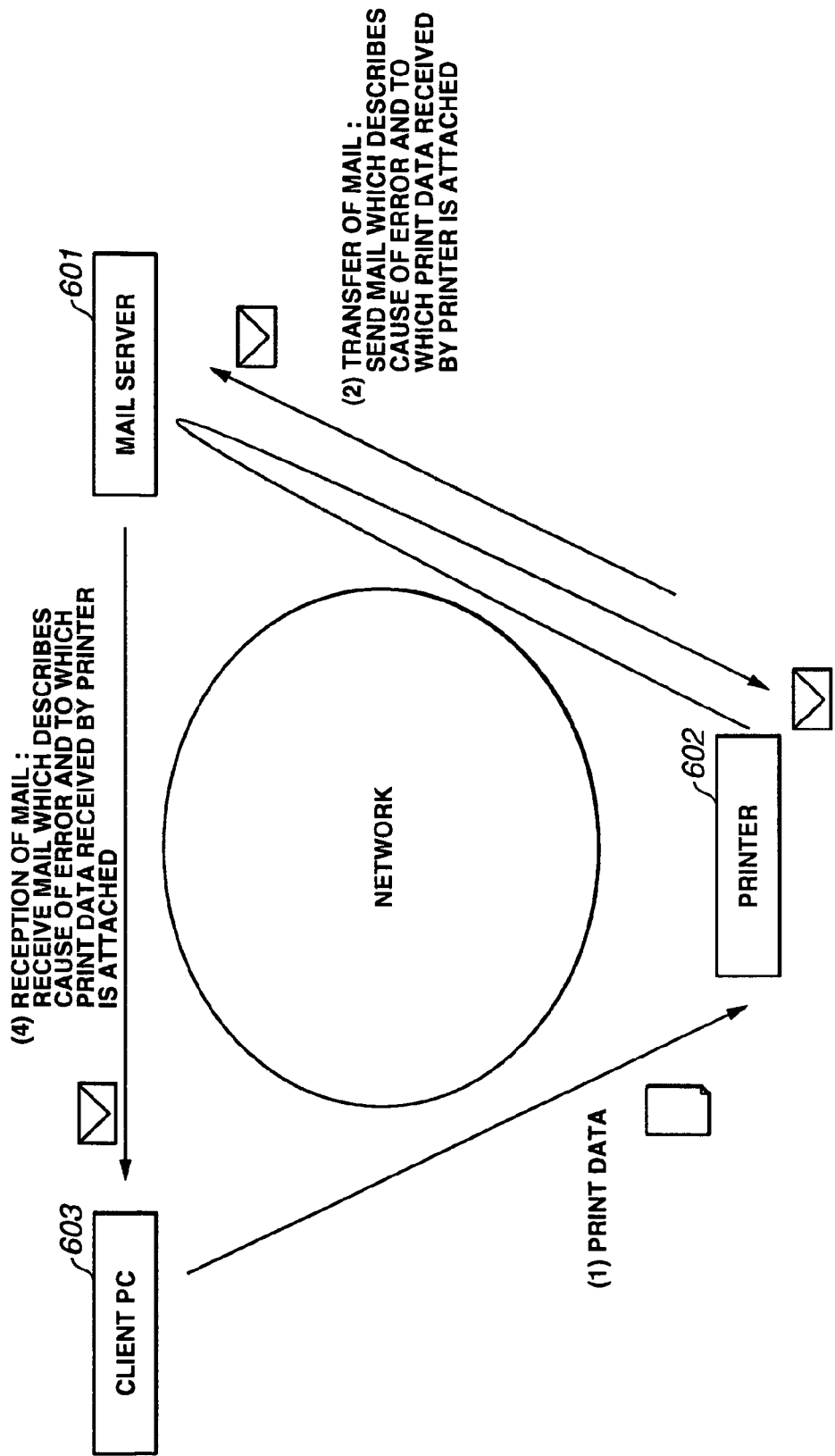
FIG. 10 is a block diagram illustrating the flow of print data and mail in the network environment including the printer 602 in a third embodiment.

FIG. 10 is a block diagram illustrating the flow of print data and mail in the network environment including the printer 602 to which the present invention is applied.

First, the client PC 603 which makes a print request transmits print data to the printer 602 by using a printing protocol (LPD or the like).

In the interior of the printer 602 to which the print data has been sent, the print data is accepted by the network module 701.

The accepted print data is sent to the image processing unit 702 and is developed into raster data.

Then, printing is started by the printing device 706 by using the print data developed into the raster data by the image processing unit 702.

However, in a case where printing has not been effected properly due to a failure occurring in the printer 602, running out of paper, running out of toner, or the like, electronic mail describing the cause of the error and having attached thereto the print data accepted by the network module 701 is sent from the mail unit 703 to the printer 602.

After the lapse of a fixed period of time upon sending the electronic mail to an own device (which hereinafter refers to the printer 602 in this embodiment) 602, or after the cause of printing failure has been remedied, the printer 602 receives the mail sent to the own device 602 and attempts at printing again.

When receiving from the mail server the electronic mail to the own device 602 with the print data attached thereto to attempt at reprinting, the printer 602 leaves that mail in the mail server without deleting it, and deletes the mail from the mail server when it was possible to print properly.

In a case where printing was impossible in the final end after repeating the attempt of reprinting, the cause of printing failure and the print data accepted by the network module 701 are transferred by mail to the client PC 603 which sent the print data or to a designated user. Subsequently, the electronic mail which was received to attempt at reprinting and was left in the mail server without being deleted and to which the print data was attached is deleted.

The electronic mail which was sent from the printer 602 and in which the cause printing failure is described with the print data attached thereto reaches the client PC 603 or the like via the mail server 601.

On the client PC 603 side or the like to which the electronic mail has been sent, it is possible to confirm the cause of printing failure by viewing the contents of the electronic mail, and it is possible to obtain the print data attached to the electronic mail.

Next, referring to FIG. 11 which is a flowchart, a description will be given of the processing which is effected inside the printer 602 in accordance with this embodiment.

Figure 11:
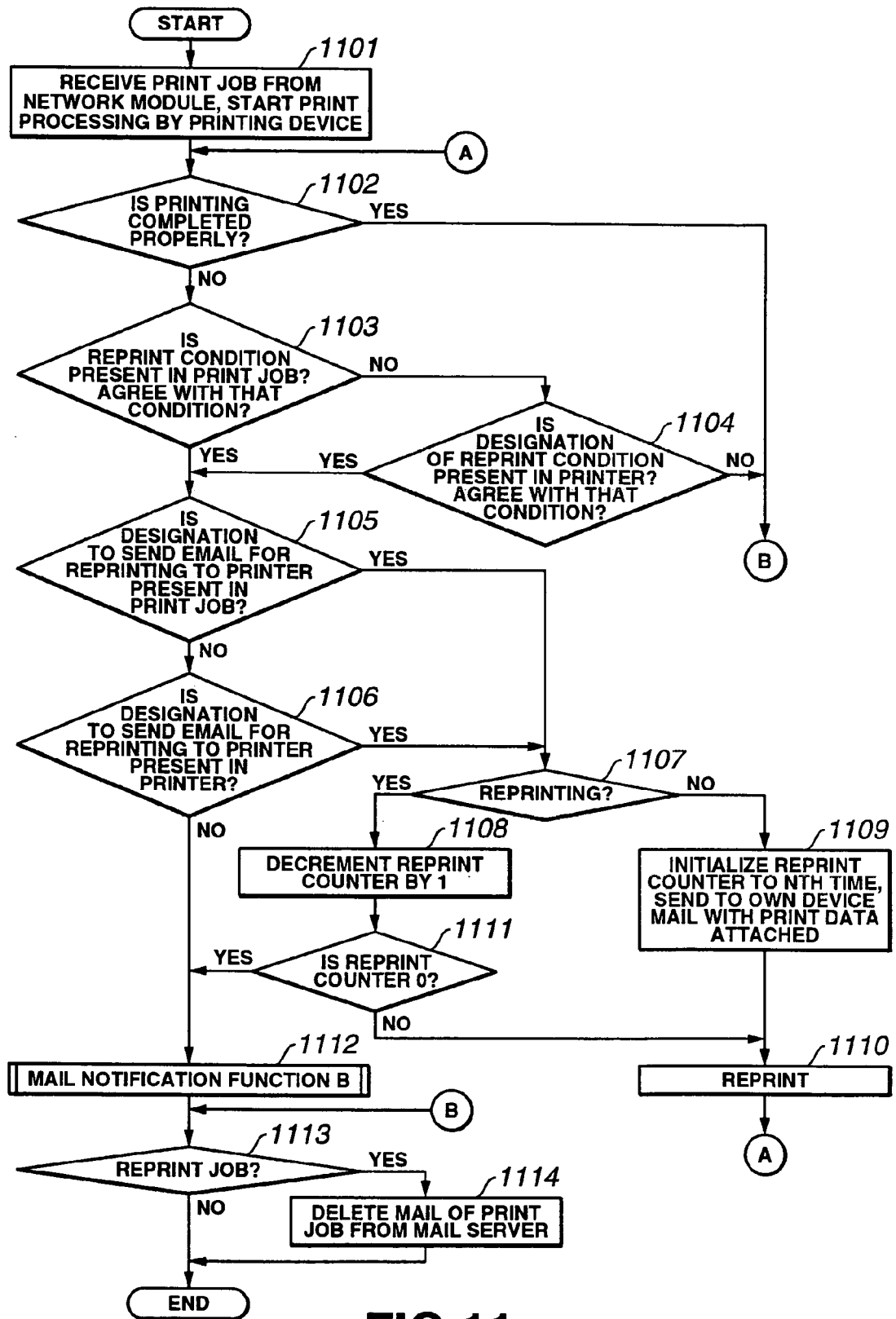
FIG. 11 is a flowchart illustrating the flow of processing which is effected by the printer 602 in the third embodiment.

FIG. 11 is a flowchart illustrating the flow of processing which is effected by the printer 602 in accordance with this embodiment.

When the printer 602 receives the print job from the client PC 603 through the network module 701, the print data is rasterized in the image processing unit 702, and printing is effected by the printing device 706 (Step 1101).

If printing was not completed properly (NO in Step 1102), a determination is made as to whether or not there is a reprinting condition in the accepted print job and whether or not the situation disabling printing agrees with that reprinting condition (Step 1103).

If there is no reprinting condition in the accepted print job, or even if there is, if the situation does not agree with that condition, a determination is then made as to whether or not there is a designation of a reprinting condition in the printer 602 and whether or not the situation disabling printing agrees with that condition (Step 1104).

In Step 1104, if there is no designation of a reprinting condition in the printer 602, or even if there is, if the situation disabling printing does not agree with that reprinting condition (NO in Step 1104), the processing in this embodiment ends.

However, if there is a designation of a reprinting condition in the printer 602, and if the situation disabling printing agrees with that reprinting condition (YES in Step 1104), a determination is made as to whether or not the print job or the printer has a designation for sending electronic mail for reprinting to the printer 602 (Step 1105 or Step 1106).

In Step 1105 or Step 1106, if the print job or the printer has a designation for sending electronic mail for reprinting to the printer 602 (YES in Step 1105 or Step 1106), a determination is made as to whether or not the printing which was effected is reprinting effected by receiving the mail from the mail server 601 (Step 1107).

If it was not reprinting, the reprint counter stored in the parameter storing unit 704 is initialized to the Nth time.

The value of N is set in the printer 602 as a fixed or variable default value, or is set for each print job which is requested to the printer 602 from the client PC 104.

When the reprint counter is initialized to the Nth time in the parameter storing unit 704, the mail unit 703 sends to the own device 602 the mail to which the print data accepted by the network module 701 is attached (Step 1109).

Then, after the lapse of a fixed period of time upon sending the mail to the own device 602, or after the cause of printing failure has been remedied, the mail unit 703 receives the mail to the own device 602, and printing is effected again (Step 1110).

In Step 1110, when the printer 602 receives mail from the mail server 601, the mail which is received from the mail server is left in the mail server without being deleted.

When reprinting is effected and print processing is completed properly, the mail which was left in the mail server 601 is deleted, and the processing ends. However, in a case where the print processing is not completed properly, a determination is made in Step 1107 through Step 1103 or Step 1104 and through Step 1105 or Step 1106 that it is a reprint job. Subsequently, the reprint counter stored in the parameter storing unit 704 is decremented by one in the parameter interpreting and converting unit 705, and the decremented reprint counter is stored in the parameter storing unit 704 (Step 1108).

Next, a determination is made in the parameter interpreting and converting unit 705 as to whether or not the reprint counter stored in the parameter storing unit 704 is 0 (Step 1111).

If the reprint counter is not 0, after the lapse of a fixed period of time or after the cause of printing failure has been remedied, the printer 602 receives again from the mail server 601 the mail addressed to the own device 602 with the print data attached thereto, and reprinting is effected.

In Step 1111 if it is confirmed that the reprint counter has been set to 0 in the parameter interpreting and converting unit 705, reprinting is not effected anymore. Next, the mail notification function B-950 is executed to send to a designated destination electronic mail describing the cause of printing failure and having the print data of a designated format attached thereto (processing in the subroutine in Step 1112).

The processing of the mail notification function B-950 in Step 1112 is the processing in Step 903 to Step 911 in the flowchart shown by referring to FIG. 9 in the second embodiment. Since it is the same processing as that described in the second embodiment, a description thereof will be omitted here to avoid redundancy.

When the mail is transmitted in the mail notification function B-950, the mail which was left in the mail server 601 without being deleted is deleted, and the processing ends.

In addition, before reprinting is effected, if the print job or the printer 602 does not have a designation for sending electronic mail for reprinting to the printer 602 in Step 1105 or Step 1106, the mail notification function B-950 is executed (Step 1112).

When the mail notification function B-950 is executed, electronic mail describing the cause of printing failure and having the print data attached thereto is sent to a designated mail address (Step 1112).

It has been described in this embodiment that the processing ends if, in Step 1103 and Step 1104, there is no designation of reprinting in the print job and the printer, and even if there is, if the result of printing failure does not agree with that condition. However, electronic mail describing the cause of printing failure without effecting printing or electronic mail having the print data attached to that electronic mail may be sent to the client PC 603 or a designated user.

It should be noted that even in the case where the printer 602 has a designation of a reprinting condition, and the situation disabling printing agrees with that designation of the condition, a setting may be provided in the print job such that instead of effecting the processing which leads to YES in Step 1104 for effecting reprinting, and the processing which leads to NO in Step 1104 is executed to terminate the processing.

It should be noted that in this embodiment even if the printer has a designation of sending electronic mail for reprinting to the printer 602, as described in the processing in Step 1106, a setting may be provided in the print job such that instead of effecting reprinting which is the processing which leads to NO in Step 1106, the mail notification function B-950 is executed.

It should be noted that in the mail notification function B-950 which is executed in this embodiment, even if the printer has a designation for transferring mail to a user mail address (Step 904), a setting may be provided in the print job such that processing for not sending mail, which is the processing leading to NO in Step 904, is executed.

It should be noted that in the case where printing has not been completed properly, the electronic mail sent to the own device 602 and having the print data attached thereto may not be deleted from the mail server 601, and mail describing the cause of printing failure and the fact that mail having the print data attached thereto is left in the mail server may be sent to a designated address.

Electronic mail having the print data attached thereto without effecting printing may be sent to the own device 602, and electronic mail describing the cause of printing failure and the fact that mail having the print data attached thereto is present in the mail server 601 may be sent to a designated address.

It should be noted that at the time of attaching the print data to the mail, the printed data may be discarded and only unprinted data may be attached, or all the print data may be attached.

It should be noted that in this embodiment the contents which are set in advance may be provided in the printer 602 as fixed or variable default values, or may be selected for each print job.

The present invention is usable by a printer which is connected to a network in which a server is present.

According to the present invention, in a case where printing has failed in the printer, a client PC is able to obtain the print data without forming the print data again.

The entire disclosure of Japanese Patent Application No. 2004-278378 filed on Sep. 24, 2004 including specification, claims, drawings and abstract is incorporated herein by reference in its entirety.

What is claimed is:

1. A printing system, comprising:
   a printer;
   a client device that requests the printer to print via a network; and
   a file server that is provided on the network,
   wherein the printer comprises:
   a print data receiving unit that receives print data transmitted from the client device via the network;
   a print processing unit that effects print processing on the basis of the print data received by the print data receiving unit;
   a detecting unit that detects whether the print processing by the print processing unit has been completed properly;
   a transfer unit that, when the detecting unit detects a fact that the print processing has not been completed properly, transmits print data for which the print processing has not been completed properly to the file server on the network to store the print data therein; and
   a mail transmitting unit that transmits by an email to the client device storage position information of the print data transferred by the transfer unit in the file server, and a cause of the fact that the print processing has not been completed properly, and
   the client device comprises:
   a mail receiving unit that receives an email transmitted by the mail transmitting unit from the printer; and
   a print data acquisition unit that obtains the print data from the file server on the basis of the storage position information included in the email received by the mail receiving unit.

2. The printing system according to claim 1, wherein the printer further comprises:
   a reprint controller that obtains the print data transferred by the transfer unit from the file server, and instructs the print processing unit to effect reprint processing on the basis of the obtained print data, wherein
   the mail transmitting unit transmits the email to the client device after the reprint processing has been instructed by the reprint controller.

3. The printing system according to claim 1, wherein the printer further comprises:
   a reprint controller that obtains the print data transferred by the transfer unit from the file server, and instructs the print processing unit to effect reprint processing on the basis of the obtained print data; and
   a counter that counts number of times the reprint processing has been instructed by the reprint controller, wherein
   the mail transmitting unit transmits the email to the client device when the number of times of the reprint processing counted by the counter runs up to a predetermined number of times.

4. The printing system according to claim 1, further comprising:
   a deleting unit that deletes the print data transferred to the file server by the transfer unit when the detecting unit detects that the reprint processing has been completed properly.

5. The printing system according to claim 1, wherein the transfer unit transfers print data for which the print processing has not been completed properly to the file server when a reprinting condition is designated in the print data received by the print data receiving unit, and the cause of the fact detected by the detection unit that the print processing has not been completed properly agrees with the reprinting condition, or when a reprinting condition for the print data received by the print data receiving unit is designated in the printer, and the cause of the fact detected by the detecting unit that the print processing has not been completed properly agrees with the reprinting condition.

6. The printing system according to claim 1, wherein the transfer unit, when a format of print data which is to be transferred to the file server is designated in the print data received by the print data receiving unit, transfers to the file server the print data for which the print processing has not been completed properly in the designated format, and when a format of print data which is to be transferred to the file server is not designated in the print data received by the print data receiving unit, transfers the print data for which the print processing has not been completed properly to the file server in a format designated in the printer.

7. A printing system, comprising:
a printer; and
a client device that requests the printer to print via a network,
wherein the printer comprises:
a print data receiving unit that receives print data transmitted from the client device via the network;
a print processing unit that effects print processing on the basis of the print data received by the print data receiving unit;
a detecting unit that detects whether the print processing by the print processing unit has been completed properly;
a mail transmitting unit that, when the detecting unit detects a fact that the print processing has not been completed properly, transmits to the client device an email in which a cause of the fact that the print processing has not been completed properly is described in and to which the print data is attached, and
the client device comprises:
a mail receiving unit that receives the email transmitted by the mail transmitting unit from the printer; and
a print data acquisition unit that obtains the print data included in the email received by the mail receiving unit.

8. A printing system, comprising:
a printer; and
a client device that requests the printer to print via a network,
wherein the printer comprises:
a print data receiving unit that receives print data transmitted from the client terminal via the network;
a print processing unit that effects print processing on the basis of the print data received by the print data receiving unit;
a detecting unit that detects whether the print processing by the print processing unit has been completed properly;
a mail transmitting unit that, when the detecting unit detects that the print processing has not been completed properly, transmits to the printer an email to which the print data for which the print processing has not been completed properly is attached;
a mail receiving unit that receives the email transmitted by the mail transmitting unit;
a print data acquisition unit that obtains the print data included in the email received by the mail receiving unit; and
a reprint controller that instructs the print processing unit to effect reprint processing on the basis of the print data obtained by the print data acquisition unit.

9. A printer which is connected to a client device via a network, effects print processing on the basis of a print request from the client device, comprising:
a print data receiving unit that receives print data transmitted from the client device via the network;
a print processing unit that effects print processing on the basis of the print data received by the print data receiving unit;
a detecting unit that detects whether the print processing by the print processing unit has been completed properly;
a transfer unit that, when the detecting unit detects a fact that the print processing has not been completed properly, transmits print data for which the print processing has not been completed properly to a file server on the network to store the print data therein; and
a mail transmitting unit that transmits by an email to the client device storage position information of the print data transferred by the transfer unit in the file server, and a cause of the fact that the print processing has not been completed properly.

10. The printer according to claim 9, further comprising:
a reprint controller that obtains the print data transferred by the transfer unit from the file server, and instructs the print processing unit to effect reprint processing on the basis of the obtained print data, wherein
the mail transmitting unit transmits the email to the client device after the reprint processing has been instructed by the reprint controller.

11. The printer according to claim 9, further comprising:
a reprint controller that obtains the print data transferred by the transfer unit from the file server, and instructs the print processing unit to effect reprint processing on the basis of the obtained print data; and
a counter that counts number of times the reprint processing has been instructed by the reprint controller, wherein
the mail transmitting unit transmits the email to the client device when the number of times of the reprint processing counted by the counter runs up to a predetermined number of times.

12. The printer according to claim 9, further comprising:
a deleting unit that deletes the print data transferred to the file server by the transfer unit when the detecting unit detects that the reprint processing has been completed properly.

13. The printer according to claim 9, wherein
the transfer unit transfers print data for which the print processing has not been completed properly to the file server when a reprinting condition is designated in the print data received by the print data receiving unit, and the cause of the fact detected by the detecting unit that the print processing has not been completed properly agrees with the reprinting condition, or when a reprinting condition for the print data received by the print data receiving unit is designated in the printer, and a cause of the fact detected by the detecting unit that the print processing has not been completed properly agrees with the reprinting condition.

14. The printer according to claim 9, wherein
the transfer unit, when a format of print data which is to be transferred to the file server is designated in the print data received by the print data receiving unit, transfers to the file server the print data for which the print processing has not been completed properly in the designated format, and when a format of print data which is transferred to the file server is not designated in the print data received by the print data receiving unit, transfers the print data for which the print processing has not been completed properly to the file server in a format designated in the printer.

15. A printer which is connected to a client device via a network, effects print processing on the basis of a print request from the client device, comprising:
a print data receiving unit that receives print data transmitted from the client device via the network;
a print processing unit that effects print processing on the basis of the print data received by the print data receiving unit;

a detecting unit that detects whether the print processing by the print processing unit has been completed properly; and a mail transmitting unit that, when the detecting unit detects a fact that the print processing has not been completed properly, transmits to the client device an email in which a cause of the fact that the print processing has not been completed properly is described in and to which the print data is attached.

16. A printer which is connected to a client device via a network, effects print processing on the basis of a print request from the client device, comprising:

a print data receiving unit that receives print data transmitted from the client terminal via the network;

a print processing unit that effects print processing on the basis of the print data received by the print data receiving unit;

a detecting unit that detects whether the print processing by the print processing unit has been completed properly;

a mail transmitting unit that, when the detecting unit detects the print processing has not been completed properly, transmits to the printer an email to which the print data for which the print processing has not been completed properly is attached;

a mail receiving unit that receives the email transmitted by the mail transmitting unit;

a print data acquisition unit that obtains the print data included in the email received by the mail receiving unit; and a reprint controller that instructs the print processing unit to effect reprint processing on the basis of the print data obtained by the print data acquisition unit.

* * * * *

UNITED STATES PATENT AND TRADEMARK OFFICE
CERTIFICATE OF CORRECTION

| | |
|---|---|
| PATENT NO. | : 7,760,381 B2 |
| APPLICATION NO. | : 11/061884 |
| DATED | : July 20, 2010 |
| INVENTOR(S) | : Jun Wakamatsu et al. |

Page 1 of 1

It is certified that error appears in the above-identified patent and that said Letters Patent is hereby corrected as shown below:

On the cover page, item (75) Inventors:

Amend:

"(75) Inventors: June Wakamatsu, Saitama (JP); Yuriko Inakawa, Saitama (JP); Noriyuki Tatsuma, Saitama (JP); Eijii Nishi, Saitama (JP); Atsuhiro Itoh, Saitama (JP)"

To:

--(75) Inventors: June Wakamatsu, Saitama (JP); Yuriko Inakawa, Saitama (JP); Noriyuki Tatsuma, Saitama (JP); Eiji Nishi, Saitama (JP); Atsuhiro Itoh, Saitama (JP)--

Signed and Sealed this

Nineteenth Day of October, 2010

David J. Kappos
*Director of the United States Patent and Trademark Office*

UNITED STATES PATENT AND TRADEMARK OFFICE
CERTIFICATE OF CORRECTION

PATENT NO. : 7,760,381 B2  
APPLICATION NO. : 11/061884  
DATED : July 20, 2010  
INVENTOR(S) : Jun Wakamatsu et al.

Page 1 of 1

It is certified that error appears in the above-identified patent and that said Letters Patent is hereby corrected as shown below:

On the cover page, item (75) Inventors:

Amend:

"(75) Inventors: June Wakamatsu, Saitama (JP); Yuriko Inakawa, Saitama (JP); Noriyuki Tatsuma, Saitama (JP); Eijii Nishi, Saitama (JP); Atsuhiro Itoh, Saitama (JP)"

To:

--(75) Inventors: Jun Wakamatsu, Saitama (JP); Yuriko Inakawa, Saitama (JP); Noriyuki Tatsuma, Saitama (JP); Eiji Nishi, Saitama (JP); Atsuhiro Itoh, Saitama (JP)--

This certificate supersedes the Certificate of Correction issued October 19, 2010.

Signed and Sealed this  
First Day of February, 2011

David J. Kappos  
*Director of the United States Patent and Trademark Office*